E. R. EVANS.
FRONT AXLE CONSTRUCTION.
APPLICATION FILED JUNE 4, 1917.
1,276,046.
Patented Aug. 20, 1918.
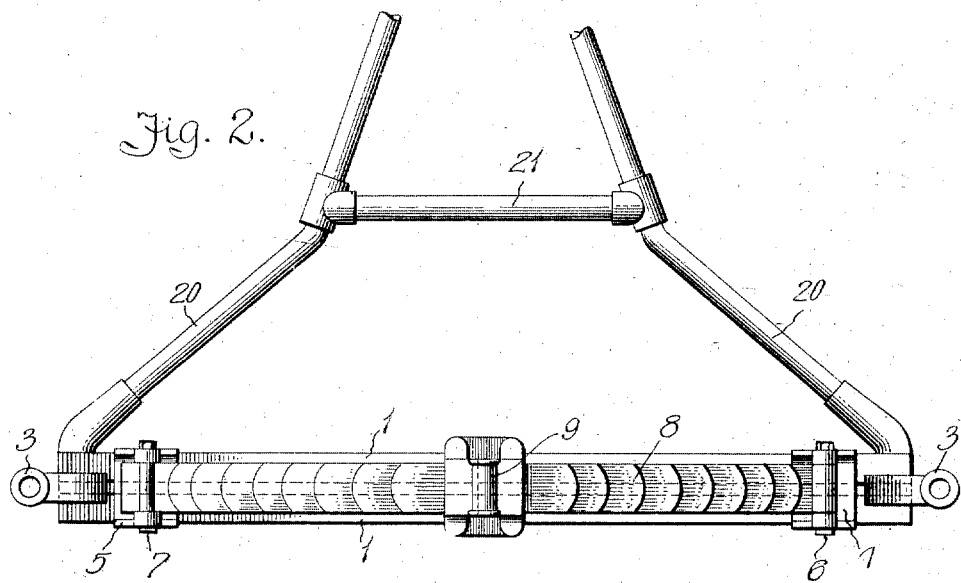
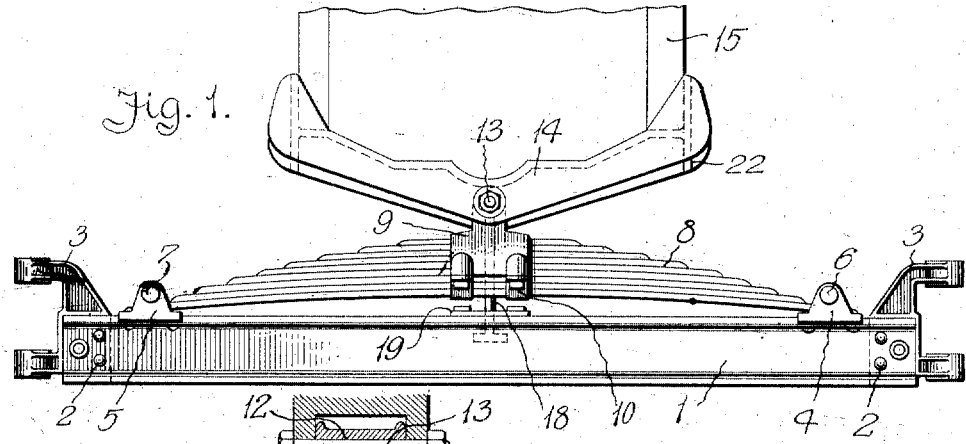
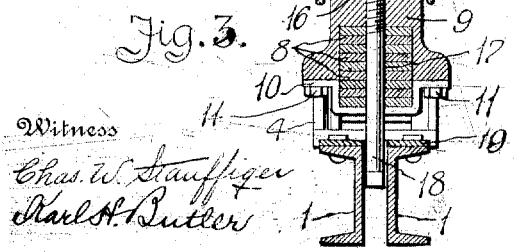
Inventor
Edwin R. Evans,

UNITED STATES PATENT OFFICE.

EDWIN R. EVANS, OF DETROIT, MICHIGAN.

FRONT-AXLE CONSTRUCTION.

1,276,046.     Specification of Letters Patent.     Patented Aug. 20, 1918.

Application filed June 4, 1917.  Serial No. 172,579.

*To all whom it may concern:*

Be it known that I, EDWIN R. EVANS, a citizen of the United States of America, residing at Detroit, in the county of Wayne and State of Michigan, have invented certain new and useful Improvements in Front-Axle Constructions, of which the following is a specification, reference being had therein to the accompanying drawings.

This invention relates to front axle construction for tractors and other vehicles, and the primary object of my invention is to furnish a novel front axle with a strong and durable front end bearing for a tractor frame and parts thereof, the bearing including a leaf spring that obviates the necessity of using shackle arms, the leaf spring having a limited action relative to the front axle, without interfering with normal adjustments of the front end of the tractor frame relative to the front axle.

A further object of my invention is to articulate the front end of the tractor or frame relative to a front axle so that the front axle may assume various inclinations without effecting the position of the tractor body or frame. Such an arrangement permits of a tractor traveling over very irregular ground, as encountered in a plowed field or on extremely rough roads.

The above are a few of the objects attained by a mechanical construction which will be hereinafter specifically described and then claimed, and reference will now be had to the drawing, wherein—

Figure 1 is a front elevation of the axle construction and the bearing of the tractor frame;

Fig. 2 is a plan of the same with the tractor frame removed, and

Fig. 3 is a central vertical sectional view of the front axle construction.

The front axle is composed of two channel bars 1 arranged in parallelism, back to back, as best shown in Fig. 3, and the ends of these channel bars are connected, as at 2, with bearings 3 therebetween for the knuckles of steering wheels (not shown).

Riveted or otherwise connected to the upper lateral flanges of the bars 1 adjacent the bearings 3, are channel bearings 4 and 5 having the side flanges thereof connected by pins 6 and 7 respectively.

Connected to the pin 6 of the bearing 4 in the usual and well known manner is an end of a leaf spring 8 disposed longitudinally of the front axle with the opposite end thereof extending under the pin 7 and resting upon the bearing 5. With only one end of the spring 8 fixed relative to the front axle, said spring may yield and serve as a cushion member, without using shackle arms at the ends of said spring.

Embracing the upper portion of the spring 8, intermediate the ends thereof, is a fulcrum member 9 and this member is held on the intermediate portion of the spring 8 by straps 10 and screw bolts 11. The fulcrum member 9 has a longitudinal opening 12 to receive a pivot bolt 13, said bolt extending through the front end frame 14 of a tractor 15. The fulcrum member 9 also has a vertical opening 16 in alinement with an opening 17 centrally of the spring 8, and extending upwardly through the opening 17 and tapped or otherwise secured in the opening 16 is a depending T bolt 18. The T bolt 18 extends through a stop or guide plate 19 connecting the channel bars 1 of the front axle, and with the head of said T bolt between the channel bars 1, the upward movement or flexure of the spring 8 is limited by the head of the bolt engaging the stop member 19.

The same fastening means connecting the bearings 3 to the front axle may also assist in holding the ends of radius rods 20 at the ends of the front axle, said radius rods being connected by a connecting member 21.

From the foregoing, it will be observed that the front axle may have a tilting action relative to the tractor frame, without affecting the stability of the tractor and without subjecting the front spring 8 to excessive strain or stresses.

The front end frame 14 of the tractor 15 may have depending stops or flanges 22 to engage the spring 8 and limit the tilting of the front end frame relatively to the spring 8 or front axle.

One embodiment of my invention has been illustrated but it is to be understood that the structural elements are susceptible to such modifications and variations as fall within the scope of the appended claims.

What I claim is:—

1. A front axle construction and bearing for a vehicle frame, comprising channel bars, arranged in parallelism, a leaf spring having one end thereof held on said channel bars and the opposite end thereof loose on said channel bars, a fulcrum member intermediate the ends of said spring and adapted to pivotally support a vehicle frame, and means carried by said fulcrum member adapted to limit the flexure of said spring in one direction relative to said channel bars.

2. The combination of an axle, a leaf spring on said axle having an end thereof held by said axle and the other free on said axle, and means adapted to engage said axle to limit the upward flexing of said spring.

3. A front axle construction and bearing for a tractor frame, comprising channel bars, knuckle bearings between the ends of said bars, a leaf spring having one end thereof fixed adjacent to one of said knuckle bearings and the other end thereof loose adjacent the other knuckle bearing, a fulcrum member carried by said spring, and adapted for pivotally holding the front end of the tractor frame, and means carried by said fulcrum member extending between said channel bars and adapted to limit the flexure of said spring in one direction.

4. The combination with a tractor frame, of a front axle a leaf spring having one end thereof fixed relative to said axle and the other end thereof loose and adapted to have flexure thereof limited in one direction by said axle, a fulcrum member carried by said spring and pivotally connected to said tractor frame, and means carried by said fulcrum member having a limited movement relative to said axle adapted to limit the flexure of said spring in the opposite direction.

5. The combination with a tractor frame, of a front axle, channel bearings carried thereby, a leaf spring having one end thereof fixed in one of said bearings and the opposite end thereof loose in the other bearing, a fulcrum member carried by said spring and pivotally connected to said tractor frame, and means connected to said fulcrum member and extending through said spring and having a limited movement relative to said axle adapted to limit the flexure of said spring in one direction.

6. The combination of a front axle, a spring thereon, a member intermediate the ends of said spring, a tractor frame having the front end thereof pivotally connected to said member, and means carried by said member having a limited movement relative to said axle to limit the flexure of said spring away from said axle.

In testimony whereof I affix my signature in the presence of two witnesses.

EDWIN R. EVANS.

Witnesses:
KARL H. BUTLER,
ANNA M. DORR.